United States Patent
Pfaff et al.

(10) Patent No.: US 6,640,163 B1
(45) Date of Patent: Oct. 28, 2003

(54) OPERATING SYSTEM FOR A PROGRAMMABLE CONTROLLER OF A HYDRAULIC SYSTEM

(75) Inventors: Joseph L. Pfaff, Wauwatosa, WI (US); Robert J. Willard, Mukwonago, WI (US)

(73) Assignee: Husco International, Inc., Waukesha, WI (US)

( * ) Notice: Subject to any disclaimer, the term of this patent is extended or adjusted under 35 U.S.C. 154(b) by 0 days.

(21) Appl. No.: 10/260,893

(22) Filed: Sep. 30, 2002

(51) Int. Cl.[7] .............................................. G05D 11/02
(52) U.S. Cl. ........................ 700/282; 700/11; 700/203; 702/12
(58) Field of Search .......................... 700/282, 11, 180, 700/181, 18, 203; 709/103; 702/12; 707/104.1

(56) References Cited

U.S. PATENT DOCUMENTS 5,193,189 A * 3/1993 Flood et al. .................. 700/11
6,105,520 A * 8/2000 Frazer et al. ................. 700/138
6,477,439 B1 * 11/2002 Bernaden et al. ............ 700/103
6,505,341 B1 * 1/2003 Harris et al. ................. 717/100

* cited by examiner

Primary Examiner—Albert W. Paladini
(74) Attorney, Agent, or Firm—George E. Haas; Quarles & Brady LLP

(57) ABSTRACT

A programmable controller, for operating a machine such as one having a hydraulic system, includes a memory that stores a plurality of software function routines. A memory contains a first data file with address pointers to the function routines where the address pointers are listed in the order that the function routines may be executed. A second data file has a separate record associated with each of the address pointers and each record identifies the data variables required by the corresponding function routine. A third data file contains information about each of the variables. A code sequencer accesses the first data file and directs execution of the function routine in the order designated by the pointers. As each function routine executes, the respective record in the second data file is used to access the required variable information.

17 Claims, 2 Drawing Sheets

OPERATING SYSTEM FOR A PROGRAMMABLE CONTROLLER OF A HYDRAULIC SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to electronically controlled hydraulic systems for operating machinery, and in particular to a software operating system which governs execution of a control program by a controller in the hydraulic system.

2. Description of the Related Art

A wide variety of machines have members which are moved by an hydraulic actuator, such as a cylinder and piston arrangement that is controlled by a hydraulic valve. Traditionally the hydraulic valve was manually operate by the machine operator. There is a present trend away from manually operated hydraulic valves toward electrical controls and the use of solenoid operated valves. This type of control simplifies the hydraulic plumbing as the control valves do not have to be near the operator station, but can be located adjacent the actuator being controlled. This change in technology also enables sophisticated computerized control of the machine functions.

In a typical electrical control system, application of pressurized hydraulic fluid from a pump to a cylinder is controlled by a set of four proportional solenoid operated pilot valves, as described in U.S. Pat. No. 5,878,647. One pair of valves controls the flow of fluid from a supply line into the cylinder chambers on opposite sides of the piston and another pair of valves controls the flow of fluid from those cylinder chambers into a tank return line. By selectively opening a valve in each pair, the piston can be extended or retracted with respect to the cylinder.

Proportional solenoid operated pilot valves are well known for controlling the flow of hydraulic fluid. This type of valve employs an electromagnetic coil to move an armature that acts on the valve element which controls the flow of fluid. The amount that the valve opens is directly related to the magnitude of electric current applied to the electromagnetic coil, thereby enabling proportional control of the hydraulic fluid flow. Either the armature or the valve element is spring loaded to close the valve when electric current is removed from the solenoid coil.

When an operator desires to move a member on the machine, an input device, such as a joystick, is operated to produce an electrical signal indicative of the desired direction and rate at which the corresponding hydraulic actuator is to move. The faster the actuator is desired to move, the farther the joystick is moved from its neutral position. A control circuit receives a joystick signal and responds by producing an electric current of a given level that will drive the solenoid coil to open the associated valve element. The controller also monitors pressure at various locations in the hydraulic system to control the pump, and to ensure proper operation of the cylinders.

This type of hydraulic system is being incorporated onto construction and agricultural equipment. Although a hydraulic system and its control techniques are fundamentally the same throughout a line of machines, such as backhoes, the specific. characteristics of each machine model previously required that a different software program be written for each model. For example, the size of the cylinders and their flow requirements often differ from model to model and more expensive machine models usually have more functions and features.

Conventional software programming techniques required that a program be extensively modified for the different models. Thus it is desirable to create a control system that is easily modified to account for the specific characteristics of each machine model.

SUMMARY OF THE INVENTION

A programmable controller for operating a machine has input circuits and output circuits which interface to devices on the machine and has a processor for executing software. A memory contains a plurality of function routines, which process data to control operation of the machine, and a number of data files. A first data file stores data for a plurality of variables. A second data file holds a plurality of first memory location designators each identifying a function routine wherein the information in the second data file specifies the order in which the listed function routines are to be executed by the processor. A third data file stores a plurality of records, each of which is associated with a given first memory location designator and identifies those of the plurality of variables that are required during execution of the function routine identified by that particular first memory location designator.

A code sequencer accesses the second data file and directs execution of the function routines in the sequence specified by the plurality of first memory, location designators. As a given function routine is being executed by the processor, the third data file record associated with the first memory location designator for the given function routine is employed to access the variables in the first data file which are required by that execution.

In another embodiment of the present invention, the memory also stores an input parameter database comprising a plurality of records containing information for use in processing signals received by input circuits of the controller. An output parameter database in the memory stores a plurality of records containing information for use in producing an output signal. Input and output drivers use the information in the records of the respective input and output parameter databases to process signals exchanged with the input and output circuits.

DETAILED DESCRIPTION OF THE INVENTION

Figure 1:
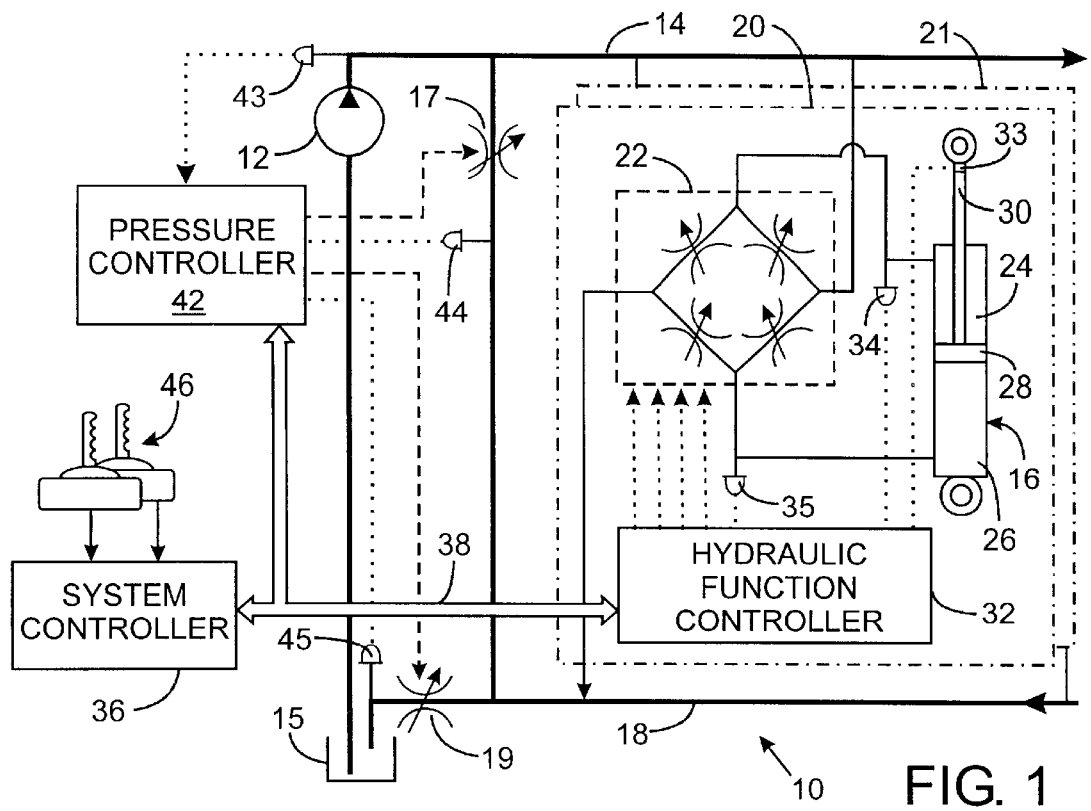
FIG. 1 is a schematic diagram of a hydraulic system incorporating the present invention.

With initial reference to FIG. 1, a hydraulic system 10 of a machine that has mechanical elements operated by hydraulically driven actuators, such as cylinder 16 or rotational motors. The hydraulic system 10 includes a positive displacement pump 12 that is driven by a motor or engine (not shown) to draw hydraulic fluid from a tank 15 and furnish the hydraulic fluid under pressure to a supply line 14. It should be understood that a variable displacement pump and other types of hydraulic actuators could be used in other applications of the hydraulic system 10. The supply line 14 is connected to a tank return line 18 by a proportional unloader valve 17 and the tank return line is connected by tank control valve 19 to the tank 15.

The supply line 14 and the tank return line 18 are connected to a plurality of hydraulic functions 20 and 21 each operating a machine member, such as moving the boom, the arm, or the bucket of a backhoe. One of those functions 20 is illustrated in detail and other functions have similar components. The hydraulic system 10 is of a distributed type in that the valves for each function and control circuitry for operating those valves are located adjacent to the actuator for that function. For example, the components for controlling movement of the arm with resect to the boom of the backhoe are located near the hydraulic cylinder at the junction between the boom and the arm.

In the given function 20, the supply line 14 is connected to a valve assembly 22 which also is connected to the tank return line 18. The valve assembly 22 includes a set of four electrohydraulic proportional valves which control the flow of hydraulic fluid to and from the cylinder 16. By operating selected valves in the assembly 22, fluid from the supply line is applied to one of the chambers 24 or 26 of the cylinder 16 and drained from the other chamber to the tank return line 18. The action moves the piston 28 within the cylinder 16 to extend or retract the rod 30 attached to the piston 28. The valve assembly 22 is operated by a hydraulic function controller 32 which receives input signals from a pair of pressure sensors 34 and 35 in the hydraulic lines connected to the chambers 24 and 26 of the cylinder 16. An input signal also is received from a force sensor 33 on the piston rod 30.

The hydraulic function controller 32 has a microcontroller with a processor that executes software which directs operation of the given hydraulic function 20 in response to commands received from a system controller 36 via a communication network, such as the "Controller Area Network" 38 developed by Robert Bosch GmbH. The Controller Area Network 38, commonly referred to as a "CAN bus", also carries commands to the other functions 21 and a pressure controller 42. Other communication links can be employed to carry these messages between the components of the hydraulic system.

The system controller 36 receives input signals from joysticks 46 controlled by the machine operator and in response thereto supervises the overall operation of the hydraulic system 10 by exchanging signals with the function controllers 32 and the pressure controller 42 via the CAN bus 38. The pressure controller 42 receives signals from three pressure sensors 43, 44 and 45 respectively coupled to the outlet of the pump 12, the return line 18, and a hydraulic line into the tank 15. In response to those pressure signals and commands from the system controller 46, the pressure controller 42 operates the tank control valve 19 and the unloader valve 17 to control the pressure in the respective hydraulic lines.

Figure 2:
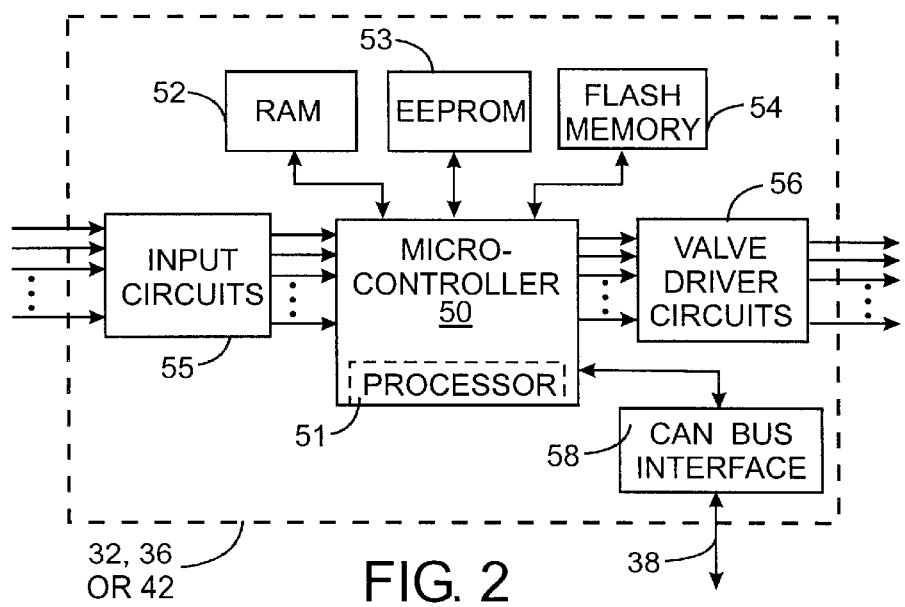
FIG. 2 is a block diagram of an electronic controller in the hydraulic system.

With reference to FIG. 2, the controllers 32, 36 and 42 have a similar hardware architecture. A microcontroller 50 includes a processor 51 which executes operating system software that controls execution of the application program for that specific controller. As will be described, the application program comprises a series of function routines that are executed in a defined sequence. The application program is stored in a flash memory device 54. Data used and created by that program are stored in an electrically erasable programmable read only memory (EEPROM) 53 and a random access memory (RAM) 52. Input devices, such as sensors and joysticks, are interfaced to the microcontroller 50 by input circuits 55 which convert the signal levels from those input devices to levels compatible with the input ports of the microcontroller 50. Similarly, outputs of the microcontroller 50 are electrically interfaced to external components, such as the individual valves 17 and 19 and the valve assembly 22, by valve driver circuits 56. Alternatively, the input devices, such as the joysticks and sensors, may be interfaced to the microcontroller 50 via the CAN bus 58. A CAN bus interface 58 couples the microcontroller 50 to the Controller Area Network 38.

Each controller 32, 36 and 42 in the hydraulic system 10 utilizes unique operating system software which allows the electronic control of the hydraulic system to be easily customized for a particular machine on which the hydraulic system is being used. This operating system will be described in the context of the function controller 32 with the understanding that it also is utilized in the system controller 36 and the pressure controller 42 with the notable difference being the specific input and output signals, the application software, and the data.

Figure 3:
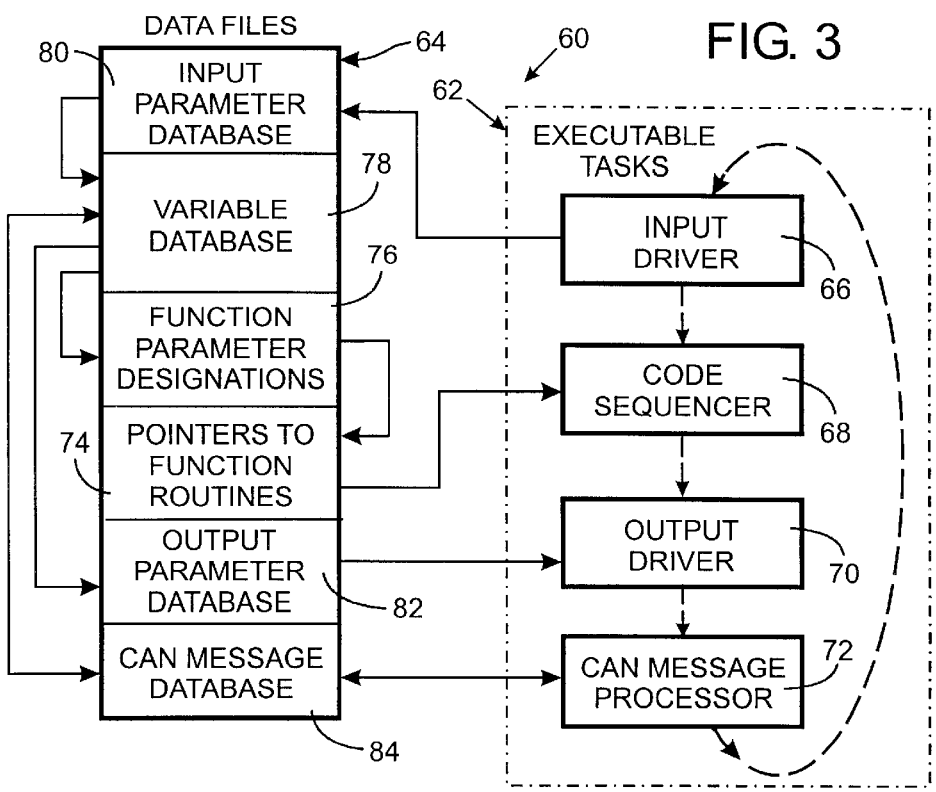
FIG. 3 is a schematic diagram of an operating system for the electronic controller illustrating data flow.

With reference to FIG. 3, the operating system 60 comprises a set of executable tasks 62 and a group of data files 64 which are used by the executable tasks, as will be described. The operating system 60 continually and sequentially loops through each of the executable tasks during normal operation. The first executable task 62 is an input driver 66 which converts analog electrical signals received by the input circuits 55 into digital values representing the parameter denoted by that input signal. A code sequencer 68 task causes the microcontroller 50 to sequentially execute each function routine of an application program. For example, a function routine may be as simple as a set of software instructions for adding two values or as complex as instructions that convert a desired fluid flow rate to an electric current magnitude to open a valve so that fluid flows there through at that rate. Another executable task is an output driver 70 which converts a digital value, produced by execution of the function routines, into an output signal for the valve driver circuits 56. The final executable task 72 handles the exchange of messages over the CAN bus 38.

Upon commencing an execution pass through the executable tasks, the input driver 66 scans the input channels of the microcontroller 50 and processes the signals from the input circuits 55. That processing results in digital data values, corresponding to those input signals, being stored as an associated variable within the RAM 52. The input driver task 66 is a generic software routine which is configured by data from the input parameter database 80 in order to process the data received on a particular microcontroller input channel. As the input driver task 66 selects each input channel, it requests the input parameter data for that channel from the database 80.

Figure 4:
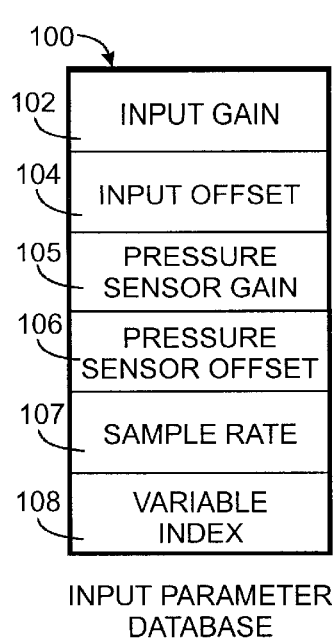
FIG. 4 depicts the data file of parameters for controlling operation of an input driver in the operating system.

FIG. 4 depicts a record 100 within the input parameter database 80 which contains information to configure the input driver task 66 to process data from one of the input channels. In the case of the hydraulic function controller 32, this set of data configures the input driver task 66 to convert an input signal from a pressure sensor 34 or 35 into the corresponding pressure value. For that conversion, the record 100 includes two data fields 102 and 104 contain an input gain and an offset value for the associated input channel of the microcontroller 50. Another pair of data fields 105 and 106 contain signal gain and offset values associated with the particular pressure sensor connected to that input channel. The gain and offset data set up the input driver 66 to process the raw digitized value of the electrical signal inputted to the microcontroller 52 into a properly scaled data value.

A sampling rate for the associated input channel is stored in data field 107. The sampling rate specifies the number of samples of the input signal that are to be averaged to produce a value for the corresponding variable. For example, each time the input channel is read, the new input value is summed with previously read values retained in a temporary storage location, after the number of samples specified by the sample rate has been accumulated, the average of the stored sum is calculated. It should be understood that a sampling rate of one causes every input data value to be stored as the associated variable, i.e., the in put data is not averaged. Whether or not averaging occurs, the resultant value is stored in the variable database as the present value for the respective pressure measurement. Data field 108 designates a specific variable in the variable database 78. In the exemplary operating system 60 the specific variable is designated by an index which identifies the entry in a variable database, for example an index of five identifies the fifth entry in the variable database 78 as the location in which to store the processed input data. Alternatively the variable could be designated by an address pointer that specifies the memory address in the variable database 78 where the input data is to be stored.

Figure 5:
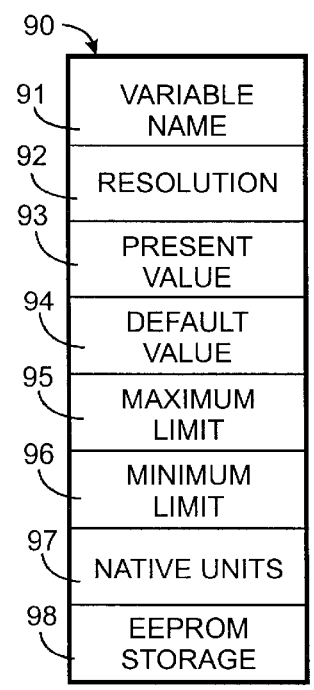
FIG. 5 represents the data structure for variables stored in the memory for use by the operating system and function routines.

The variable database 78 in RAM 52 contains information related to variables used by the operating system and the function routines. Information associated with each variable is stored in a separate record 90 which has a plurality of data fields 91–98, graphically depicted in FIG. 5. One of those data fields 91 contains the name of the variable and another field 92 contains the bit resolution required to convert the data as stored in memory into engineering units. The present value of the data and a default value for use when there is no present value, such as at start up, are stored in separate fields 93 and 94, respectively. In addition, maximum and minimum limits of the numerical value for the associated variable are provided in data fields 95 and 96, when limit checking for the variable is utilized. Data in another field 97 specifies the native units of measurement for this variable. Field 98 contains a Boolean flag, which specifies whether or not the value of this variable is also archived in the non-volatile EEPROM 53. The operating system or a function routine uses the information in these fields 91–98 when processing this variable.

After all the microcontroller input channels have been scanned and processed with the resultant values stored in the variable database 78, the operating system 60 advances to the next executable task 62 which is the code sequencer 68. Referring again to FIG. 3, the code sequencer 68, when active, steps through each function routine of the application program and directs the processor 51 in the microcontroller 50 to execute the presently selected function routine. Each function routine s designated by an address pointer stored in a data file 74, thus providing a list of the function routines to be executed by the processor 51 each time the operating system 60 activates the code sequencer 68. Each pointer within file 74 is an address within the RAM 52 where the first instruction for the respective software routine is stored. When the execution of one function routine ends, the code sequencer 68 automatically steps to the next address pointer in data file 74 which designates another function routine to be executed, unless a jump to a different address pointer is indicated, as will be described. This stepping continues until the code sequencer 68 receives an indication from the pointers in data file 74 that the last function routine has been executed.

Figure 6:
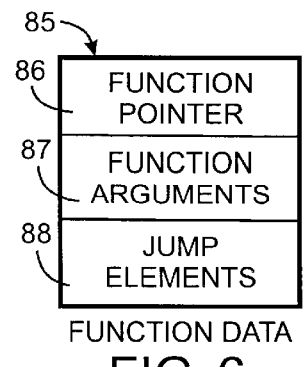
FIG. 6 depicts the structure of a table of memory location designators to function routines stored in the memory of the electronic controller.

At each such step, a block of information associated with the function routine called for execution is transferred from data file 74 to the code sequencer 68 being executed by the microcontroller 50. With reference to FIG. 6, the information is stored as a record 85 having data fields 86, 87, and 88 which respectively contain a pointer to the starting address of the respective function routine, function arguments, and a memory location designator to jump elements. The function arguments in data field 87 comprise a set of designations of variables in database 78 that have data required during the execution of the given function routine and at which to store the results of the execution. Those designations may take any one of several forms, such as database indices or address pointers. The designations are stored in another linked data file 76 and are organized in groups, each of which identifies information needed by an associated function routine address pointer in data file 74. In other words, the first record of function parameter designations in data file 76 identifies data and configuration parameters for the first function routine address pointer in data file 74. The second record in the function parameter data file 76 contains designations of similar information for the second function routine pointer in data file 74, and so on. Thus there is a linked one-to-one correspondence between the function routine pointers in data file 74 and the data and parameter designation records in data file 76. It should be understood that more than one address pointer in data file 74 may point to the same function routine. For example, a basic function routine, such as one that adds two variables, may be used many times in the application program for the hydraulic function controller 32 but with different variables. Thus the function parameter data file 76 has a different record for each instance that the same function routine is used, with each record designating a different set of variables to be used.

When the code sequencer 68 selects a given function routine for execution, the microcontroller 50 begins executing the instruction at the memory location identified by the selected address pointer in data file 74. When a data item or configuration parameter is required by that function routine, the variable designations in the linked record in data file 76 are used to access such data in the variable database 78. As an example, consider a function routine that converts the electrical signal from pressure sensor 34 into a pressure value. The arguments for that operation comprise designations of the entries in the variable database 78 which contain the digitized voltage level of the received sensor signal, a conversion factor specifying the relationship of signal voltage to pressure, and a designation of the variable in database file 75 that is to contain the results of the conversion, i.e. a value representing the pressure.

Absent an indication to the contrary, when execution of a given function routine terminates, the code sequencer 68 selects the next entry in the sequence of address pointers in data file 74 as designating the next function routine to execute. However, each function routine also includes instructions, which set a true/false indicator false when a defined condition exists. That false indication precludes the code sequencer 68 from advancing to the sequentially next function routine in the list of address pointers in data file 74. Instead the code sequencer 68 uses the jump element 88 for the finishing function routine to select a different function routine for execution. The jump element 88 indicates an entry in the list of address pointers in data file 74 which designates the subsequent function routine to be executed. Eventually the code sequencer 68 receives information from data file 74 indicating that the last function routine has been executed. This event causes the operating system 60 to advance to the next executable task 62.

That executable task is the output driver 70 which is essentially the inverse of the input driver task 66, in that values of designated variables are obtained from memory and converted into proper electrical signals for driving the associated output device. In the case of the hydraulic function controller 32, the output devices are valves within assembly 22 (FIG. 1). With continuing reference to FIG. 3, the output driver task 70 sequentially accesses each output channel of the microcontroller 50. For each output channel, there is a data record within the output parameter database 82 which contains parameters that configure the output driver task 70 to update that channel's output signal.

Figure 7:
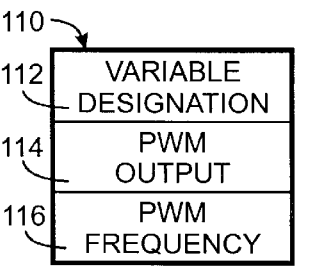
FIG. 7 illustrates the data structure of parameters stored in memory to control operation of an output driver in the operating system to produce a pulse width modulated signal for driving a solenoid valve.

FIG. 7 shows the structure of an exemplary data record 110 used to produce a pulse width modulated (PWM) signal for driving a valve within valve assembly 22. That record 110 includes a field 112 holding a designation (a table index or address pointer) of the variable in database 78 that contains the output data. In this case, the variable specifies a magnitude of the electric current that is to be applied to the associated valve. The PWM output and frequency values stored in data fields 114 and 116 are employed by the output driver 70 to convert the current magnitude value into the corresponding PWM waveform to open the associated valve the desired amount. This produces a PWM output signal which is applied by the valve driver circuits 56 to the solenoid coil of the respective valve in assembly 22.

After setting the microcontroller output channels, the operating system 60 advances to the executable task 72 for processing messages sent and received over the CAN bus 38. For example, the hydraulic function controller 32 receives messages from the system controller 36 indicating the velocity for the piston rod 30 of the associated function 20. That velocity command signal is produced by the system controller in response to an input signal from one of the joysticks 46. The incoming messages are stored in a buffer within the CAN Bus interface 58 until read by the CAN message processor task 72. The message has a predefined format which is processed by the CAN message processor task to extract the value for the commanded piston rod velocity. The CAN message processor task 72 is configured to process a message having a particular format by a data in a record stored within CAN message database 84. Data in that record indicate not only how to extract the data from the incoming message, but also designate a location in the variable database 78 at which to store the velocity command. Incoming messages with other kinds of data are processed in the same manner.

A reverse operation occurs when the hydraulic function controller 32 has a message to send over the CAN bus 38. For example, data indicating the total fluid flow that the hydraulic function 20 requires from the supply line 14 is needed by the system controller 36. As a consequence, a message is periodically constructed by the CAN message processor task 72 to convey that data to the system controller 36. To formulate that message, the CAN message processor task 72 is configured with parameters stored in the CAN message database 84. The CAN message database 84 also has a designation of the variable in the variable database 78 that contains the data to be transmitted. After all of the incoming and outgoing messages have been processed, the CAN message processor task 72 terminates and the operating system 60 returns to the code sequencer 68 to commence another pass through the set of executable tasks 62.

Instead of processing incoming messages at the end of the pass through the executable tasks, the CAN message processor 72 may be divided into an incoming messages task located before or immediately after the input driver task 66. Thus newly received messages will be processed prior to operation of the code sequencer 68. The processing of outgoing CAN messages still would occur after the output driver 70.

The present operating system enables a general control program for a product line of machines to be easily customized for each machine model. The software instructions are contained in the function routines and the control program for a particular machine is formed by the address pointers to those function routines contained in data file 76. By changing the listing of the function routine address pointers in data file 74, the control program can be changed without having to alter the software instructions.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A programmable controller for operating a machine and comprising:

input/output circuitry which interface to devices of the machine;

a processor for executing function routines and connected to the input/output circuitry;

a memory connected to the processor and storing:
(a) a plurality of function routines which process data to control operation of the machine,
(b) a first data file storing data for a plurality of variables,
(c) a data file structure storing a plurality of function routine designations each identifying one of the plurality of function routines, wherein each function routine designation specifies one or more subsequent function routines and conditions under which each subsequent function routine is to be executed, and the data file structure also storing identification of variables which are required by execution of the function routine denoted by each function routine designation; and a code sequencer which accesses the data file structure and in response directs execution of the function routines by the processor;

wherein as a given function routine is being executed by the processor, the identification of variables for the given function routine is employed by the processor to access variables in the first data file.

2. The programmable controller as recited in claim 1 wherein the data related to each of the plurality of variables stored in first data file comprises items selected from a group consisting of a name of a variable, a present value, a default value, a minimum limit, a maximum limit, and units of measurement.

3. The programmable controller as recited in claim 1 wherein the data file structure comprises:

a second data file storing the plurality of function routine designations; and a third data file storing a plurality of records, each record being associated with a given function routine designation and identifying those of the plurality of variables which are required during execution of the function routine identified by the given function routine designation.

4. The programmable controller as recited in claim 1:

wherein the memory contains an input parameter database which stores a plurality of records each containing information for use in processing an input signal received by the input/output circuitry; and further comprising an input driver which uses the information in a record of the input parameter database to process an input signal.

5. The programmable controller as recited in claim 4 wherein input driver processes the input signal to produce a data value that the input driver then stores in the first data file.

6. The programmable controller as recited in claim 4 wherein each of the plurality of records in the input parameter database specifies a gain and an offset for processing the input signal.

7. The programmable controller as recited in claim 4 wherein each of the plurality of records in the input parameter database designates a variable in the first data file for storing a result produced by processing the input signal.

8. The programmable controller as recited in claim 4 wherein each of the plurality of records in the input parameter database designates a number of samples of the input signal which are to be averaged to produce a value for storage.

9. The programmable controller as recited in claim 1:

wherein the memory also contains an output parameter database which stores a plurality of records each containing information for use in producing an output signal; and further comprising an output driver which uses the information in a record of the output parameter database to convert a data value into an output signal.

10. The programmable controller as recited in claim 9 wherein each of the plurality of records in the output parameter database designates a variable entry in the first data file where the data value is stored.

11. The programmable controller as recited in claim 9 wherein each of the plurality of records in the output parameter database specifies characteristics of a waveform of the respective output signal.

12. The programmable controller as recited in claim 1:

wherein the memory contains a message database which stores format definitions for data messages; and further comprising a message driver which uses the format definitions in the message database to exchange messages over a communication network connected to the programmable controller.

13. A method for operating a programmable controller which controls a machine, said method comprising:

storing a plurality of function routines for processing data to control operation of the machine;

storing a first data file containing data for a plurality of variables;

storing a second data file containing a plurality of function routine designations each identifying one of the plurality of function routines wherein each function routine designation specifies one or more subsequent function routines and conditions under which each subsequent function routine is to be executed;

storing a third data file containing a plurality of records each being associated with one of the function routine designations and identifying those of the plurality of variables which are required during execution of the function routine identified by that one function routine designation;

executing at least some of the plurality of function routines in a sequence specified by the plurality of function routine designations; and upon a given function routine executing, utilizing a record in the third data file to access variables in the first data file to obtain data required by the given function routine.

14. The method as recited in claim 13 further comprising:

storing an input parameter database having a plurality of records each containing information for use in processing an input signal received by the programmable controller; and utilizing the information in a record of the input parameter database to process an input signal received by the programmable controller.

15. The method as recited in claim 14 further comprising storing in the first data file a data value produced by the input driver.

16. The method as recited in claim 13 further comprising:

storing an output parameter database which has a plurality of records each containing information for use in producing an output signal; and utilizing the information in a record of the output parameter database to convert a data value into an output signal which is sent from the programmable controller.

17. The method as recited in claim 13 further comprising:

storing a message database which contains format definitions for data messages; and utilizing the format definitions in the message database to exchange messages over a communication network.

* * * * *